US009302932B2

(12) United States Patent
Kim et al.

(10) Patent No.: US 9,302,932 B2
(45) Date of Patent: Apr. 5, 2016

(54) GLASS COMPOSITION, PREPARATION METHOD THEREOF, AND COOKING APPLIANCE INCLUDING THE SAME

(71) Applicant: LG ELECTRONICS INC., Seoul (KR)

(72) Inventors: Youngseok Kim, Seoul (KR); Yongsoo Lee, Seoul (KR); Namjin Kim, Seoul (KR); Youngjun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 332 days.

(21) Appl. No.: 13/889,950

(22) Filed: May 8, 2013

(65) Prior Publication Data

US 2013/0299483 A1 Nov. 14, 2013

(30) Foreign Application Priority Data

May 10, 2012 (KR) ........................ 10-2012-0049528

(51) Int. Cl.
| | |
|---|---|
| *A21B 1/00* | (2006.01) |
| *C03C 3/21* | (2006.01) |
| *C03C 8/08* | (2006.01) |
| *F24C 15/00* | (2006.01) |
| *C03C 17/04* | (2006.01) |

(52) U.S. Cl.
CPC ... *C03C 3/21* (2013.01); *C03C 8/08* (2013.01); *C03C 17/04* (2013.01); *F24C 15/005* (2013.01); *C03C 2207/04* (2013.01); *Y10T 428/2982* (2015.01)

(58) Field of Classification Search
CPC .............. C03C 8/20; C03C 8/08; C03C 8/06; C03C 8/00; C03C 4/20; C03C 2207/04; C03C 2207/02; C03C 2207/00; C03C 2205/04; F24C 15/005; Y10T 428/28; Y10T 428/252; H05B 6/6402
See application file for complete search history.

(56) References Cited

U.S. PATENT DOCUMENTS

| | | | |
|---|---|---|---|
| 2,866,713 A | | 12/1958 | Allen |
| 5,296,415 A | * | 3/1994 | Podesta ........................ 501/25 |
| 5,993,974 A | | 11/1999 | Fukushima et al. |

(Continued)

FOREIGN PATENT DOCUMENTS

| | | |
|---|---|---|
| DE | 19512847 | 11/1996 |
| JP | H0383836 | 4/1991 |
| JP | 11139847 | * 5/1999 |

(Continued)

OTHER PUBLICATIONS

Yatsenko E A: "Formation of contact layers during pre-treatment of aluminum by chromating before enameling", Glass and Ceramics, Kluwer Academic Publishers-Plenum Publishers, NE, vol. 67, No. 9-10, Jan. 28, 2011, pp. 286-290, XP035069425,ISSN: 1573-8515, DOI:10.1007/S10717-011-9281-4 table 1; composition, 6, 6-1, 6-2.

*Primary Examiner* — Shawntina Fuqua
(74) *Attorney, Agent, or Firm* — Dentons US LLP

(57) ABSTRACT

Provided are a glass composition, preparation method thereof, and cooking appliance including the glass composition. The glass composition includes a glass frit containing $P_2O_5$, a Group I-based oxide, and a Group III-based oxide. The Group I-based oxide is selected from $Na_2O$, $K_2O$, and $Li_2O$, the Group III-based oxide is selected from $Al_2O_3$ and $B_2O_3$, and the glass frit contains about 40 wt % to about 75 wt % of $P_2O_5$.

10 Claims, 2 Drawing Sheets

(56) References Cited

U.S. PATENT DOCUMENTS

2005/0148722 A1 7/2005 Aronica et al.
2011/0049122 A1* 3/2011 Baek et al. .................... 219/385

FOREIGN PATENT DOCUMENTS

JP H11139847 5/1999
JP 2005-008974 A 1/2005

* cited by examiner

GLASS COMPOSITION, PREPARATION METHOD THEREOF, AND COOKING APPLIANCE INCLUDING THE SAME

CROSS-REFERENCE TO RELATED APPLICATIONS

The present application claims priority under 35 U.S.C. §119 to Korean Patent Application No. 10-2012-0049528 filed on May 10, 2012 which is hereby incorporated by reference in its entirety.

BACKGROUND

The present disclosure relates to a glass composition.

Generally, cooking appliances are home appliances for heating and cooking foods using a heat source. Slops generated during the cooking may be attached to a door of such a cooking appliance. Thus, after foods are cooked in the cooking appliance, it is necessary to clean the door. Also, the cooking of foods may involve a high temperature, and the door may be exposed to organic materials and alkali components. Thus, when a glass composition is used in cooking appliances, the glass composition should have heat resistance, chemical resistance, wear resistance, and contamination resistance. Therefore, a glass composition for improving the heat-resistance, the chemical resistance, the wear resistance, and the contamination resistance may be needed.

A glass composition fired in a paste state on a glass has been mainly developed so far for the use of functions different from a cleaning function. For example, a glass composition for a transparent dielectric is disclosed in Korean Patent Publication No. KR10-2009-0079148, and a glass composition for a sealing agent is disclosed in US Patent Application Publication No. US2011/0053753A1.

Thus, it is required to develop a glass composition having the cleaning performance which is capable of being used in the cooking appliances is required.

SUMMARY

Embodiments provide a glass composition having high transmittance and a preparation method thereof.

In one embodiment, a glass composition include: a glass frit containing $P_2O_5$, a Group I-based oxide, and a Group III-based oxide, wherein the Group I-based oxide is selected from $Na_2O$, $K_2O$, and $Li_2O$, the Group III-based oxide is selected from $Al_2O_3$ and $B_2O_3$, and the glass frit contains about 40 wt % to about 75 wt % of $P_2O_5$.

The glass frit may contain about 65 wt % to about 75 wt % of $P_2O_5$.

The Group I-based oxide may include $Na_2O$ and $K_2O$, and the Group III-based oxide may include $Al_2O_3$ and $B_2O_3$.

The glass frit may further contain ZnO. The glass frit may further contain $TiO_2$.

The glass frit may have a glass deformation temperature of more than about 410° C. The glass frit may have a light transmittance of about 70% to about 75%. The glass frit may have a diameter of about 0.1 μm to about 50 μm The glass frit may further contain one or more of $SiO_2$, $ZrO_2$, CaO, MgO, BaO, and $WO_3$.

The glass frit may contain about 45 wt % to about 75 wt % of $P_2O_5$, about 0.1 wt % to about 10 wt % of $Al_2O_3$, about 10 wt % to about 20 wt % of $Na_2O$, about 0.1 wt % to about 10 wt % of $K_2O$, about 0.1 wt % to about 20 wt % of $B_2O_3$, about 0.1 wt % to about 40 wt % of ZnO, and about 0.1 wt % to about 5 wt % of $TiO_2$.

The glass frit may contain about 65 wt % to about 75 wt % of $P_2O_5$, about 1 wt % to about 3 wt % of $Al_2O_3$, about 15 wt % to about 18 wt % of $Na_2O$, about 4 wt % to about 5 wt % of $K_2O$, about 3 wt % to about 4 wt % of $B_2O_3$, about 2 wt % to about 4 wt % of ZnO, and about 0.1 wt % to about 1 wt % of $TiO_2$.

In another embodiment, a method of preparing a glass composition includes: preparing a glass frit material including $P_2O_5$, a Group I-based oxide, and a Group III-based oxide; melting the glass frit material; and quenching the melted glass frit material to form a glass frit, wherein the Group I-based oxide is selected from $Na_2O$, $K_2O$, and $Li_2O$, the Group III-based oxide is selected from $Al_2O_3$ and $B_2O_3$, and the glass frit contains about 40 wt % to about 75 wt % of $P_2O_5$.

In further another embodiment, a cooking appliance includes: a cavity defining a cooking chamber; a door selectively opening or closing the cooking chamber; at least one heating source providing heat for heating foods into the cooking chamber; and a coating layer formed of the above-described glass composition, which is coated on a back surface of the door facing the cooking chamber in a state where the cooking chamber is covered.

The details of one or more embodiments are set forth in the accompanying drawings and the description below. Other features will be apparent from the description and drawings, and from the claims.

DETAILED DESCRIPTION OF THE EMBODIMENTS

Figure 1:
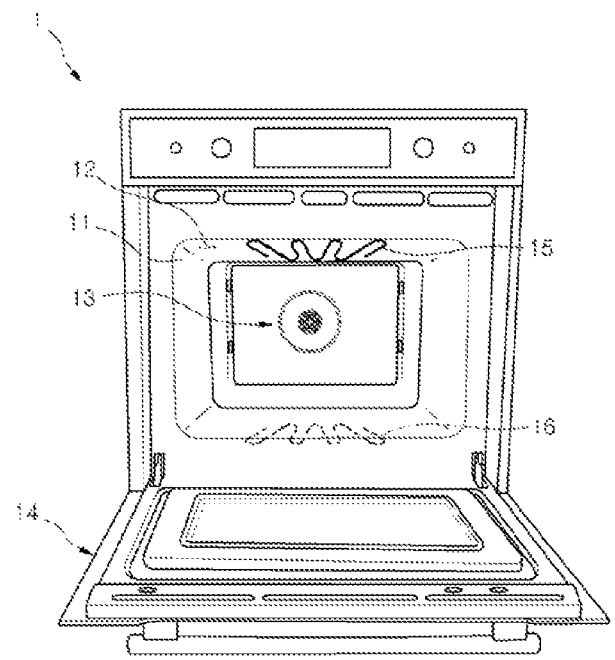
FIG. 1 is a front view of a cooking appliance according to an embodiment.

A glass composition according to an embodiment includes a glass frit containing $P_2O_5$, a Group I-based oxide, and a Group III-based oxide.

The Group III-based oxide is selected from $Al_2O_3$ and $B_2O_3$.

In an embodiment, the glass frit may further contain ZnO.

In an embodiment, the glass frit may further contain $TiO_2$.

In an embodiment, the glass frit may further contain one or more of $SiO_2$, $ZrO_2$, BaO, and $WO_3$.

The glass frit may contain about 40 wt % to about 75 wt % of $P_2O_5$. Particularly, the glass frit may contain about 45 wt % to about 75 wt % of $P_2O_5$. More particularly, the glass frit may contain about 65 wt % to about 75 wt % of $P_2O_5$.

The Group I-based oxide is selected from $Na_2O$, $K_2O$, and $Li_2O$. Particularly, the Group I-based oxide may include $Na_2O$, $K_2O$ and $Li_2O$. That is, the glass frit may further contain all of $Na_2O$, $K_2O$, and $Li_2O$.

$Na_2O$ may be contained in an amount of about 10 wt % to about 20 wt % in the glass frit. Particularly, $Na_2O$ may be contained in an amount of about 15 wt % to about 18 wt % in the glass frit.

$K_2O$ may be contained in an amount of about 0.1 wt % to about 10 wt % in the glass frit. Particularly, $K_2O$ may be contained in an amount of about 4 wt % to about 5 wt % in the glass frit.

$Li_2O$ may be contained in an amount of about 0.1 wt % to about 5 wt % in the glass frit.

The glass frit may contain about 10 wt % to about 25 wt % of the Group I-based oxide. Particularly, the glass frit may contain about 20 wt % to about 23 wt % of the Group I-based oxide.

Thus, $P_2O_5$ and the Group I-based oxide may be contained in an amount of about 50 wt % to about 95 wt % in the glass frit. Particularly, $P_2O_5$ and the Group I-based oxide may be contained in an amount of about 75 wt % to about 90 wt % in the glass frit.

$P_2O_5$ and the Group I-based oxide ($Na_2O$, $K_2O$, and/or $Li_2O$) may be main components of the glass frit. $P_2O_5$ and the Group I-based oxide may form an alkali phosphate glass structure and may provide an improved clean performance to the glass composition according to an embodiment. That is, since the glass frit contains $P_2O_5$ and the Group-I based oxide, when a coating film formed of the glass composition according to an embodiment is contaminated by foods, the coating film may be easily cleaned by water.

The Group III-based oxide is selected from $Al_2O_3$ and $B_2O_3$.

$Al_2O_3$ may be contained in an amount of about 0.1 wt % to about 10 wt % in the glass frit. Particularly, $Al_2O_3$ may be contained in an amount of about 1 wt % to about 3 wt % in the glass frit.

$B_2O_3$ may be used as a flux for making a homogeneous glass composition and may control the thermal expansion coefficient and the glass softening point of the glass composition. $B_2O_3$ may be contained in an amount of about 0.1 wt % to about 20 wt % in the glass frit. Particularly, $B_2O_3$ may be contained in an amount of about 3 wt % to about 4 wt % in the glass frit.

$ZrO_2$, $Al_2O_3$, $TiO_2$, $WO_3$, and/or BaO may improve heat resistance characteristics of the glass composition according to an embodiment. Particularly, $ZrO_2$, $Al_2O_3$ and $TiO_2$ may be combined with each other to improve heat resistance characteristics of the glass composition according to an embodiment.

The glass frit may have a glass deformation temperature of about 410° C. or more. For example, the glass frit may have a glass deformation temperature of about 420° C. to about 700° C. Thus, the coating film formed of the glass composition according to an embodiment may have a glass deformation temperature of about 410° C. or more, and more particularly, a glass deformation temperature of about 420° C. to about 700° C. As a result, the glass composition according to an embodiment may form a coating film which is not deformed at a high temperature. $SiO_2$ may be used to control the glass deformation temperature of the composition.

Also, $AlO_2$ and $ZrO_2$ may improve chemical durability of the glass frit. Particularly, $AlO_2$ and $ZrO_2$ may complement weak chemical resistance of the alkali phosphate glass structure formed of $P_2O_5$ and the Group I-based oxide.

$ZrO_2$ may be contained in an amount of about 0.1 wt % to about 5 wt % in the glass frit.

BaO may be contained in an amount of about 0.1 wt % to about 5 wt % in the glass frit.

$TiO_2$ may be contained in an amount of about 0.1 wt % to about 5 wt % in the glass frit. Particularly, $TiO_2$ may be contained in an amount of about 0.1 wt % to about 1 wt % in the glass frit.

$WO_3$ may be contained in an amount of about 0.1 wt % to about 5 wt % in the glass frit.

ZnO may be contained in an amount of about 0.1 wt % to about 10 wt % in the glass frit. Particularly, ZnO may be contained in an amount of about 2 wt % to about 4 wt % in the glass frit.

Also, the glass composition may further include a Group II-based oxide. The Group II-based oxide may be selected from CaO and MgO. Particularly, the Group II-based oxide may contain CaO and MgO. That is, the glass frit may contain CaO and MgO.

The Group II-based oxide may be contained in an amount of about 0.1 wt % to about 3 wt % in the glass frit.

Also, the glass frit may contain about 45 wt % to about 75 wt % of $P_2O_5$, about 0.1 wt % to about 10 wt % of $Al_2O_3$, about 10 wt % to about 20 wt % of $Na_2O$, about 0.1 wt % to about 10 wt % of $K_2O$, about 0.1 wt % to about 20 wt % of $B_2O_3$, about 0.1 wt % to about 40 wt % of ZnO, and about 0.1 wt % to about 5 wt % of $TiO_2$.

Particularly, the glass frit may contain about 65 wt % to about 75 wt % of $P_2O_5$, about 1 wt % to about 3 wt % of $Al_2O_3$, about 15 wt % to about 18 wt % of $Na_2O$, about 4 wt % to about 5 wt % of $K_2O$, about 3 wt % to about 4 wt % of $B_2O_3$, about 2 wt % to about 4 wt % of ZnO, and about 0.1 wt % to about 1 wt % of $TiO_2$.

The glass frit may have a diameter of about 0.1 μm to about 50 μm. Also, the glass frit may be dispersed into a solvent such as acetone or water. That is, the glass composition according to an embodiment may be used by dispersing the glass frit into the solvent. Also, the glass composition according to an embodiment may further include an organic binder. That is, the glass composition according to an embodiment may be used as a form of paste.

The glass composition according to an embodiment may be prepared by following processes.

First, a glass frit material for forming the glass frit is prepared. A glass composition material according to an embodiment includes $P_2O_5$, a Group I-based oxide, and a Group III-based oxide. Also, the glass frit material may further include ZnO. Also, the glass frit material may further include $TiO_2$. The glass frit material may further include one or more of $SiO_2$, $ZrO_2$, BaO, and $WO_3$. Also, the glass frit material may further include a Ground II-based oxide including CaO and/or MgO.

Thereafter, the glass frit material may be melted. For example, the glass frit material may be melted at a temperature of about 1,300° C. to about 1,600° C. Also, the glass frit material may be melted for about 1 hour to about 1.5 hours.

Thereafter, the melted glass frit material may be quenched by using water or a chiller. As a result, the glass frit may be formed. Here, a content of each of the components of the glass frit may be determined according to a content of each of the components included in the glass frit material. That is, a content of each of the components included in the glass frit material may be substantially equal to that of each of the components of the glass frit.

Thereafter, the glass frit may be dispersed by a solvent such as acetone or ethyl alcohol. Thereafter, the glass frit dispersed into the solvent may be milled by a planetary mill. Thereafter, the solvent may be dried. Thereafter, the glass frit may be filtered by a mesh or the like. Particularly, the glass frit may be filtered so that the glass frit has a diameter of about 50 μm or less.

As described above, a glass composition including the glass frit may be formed.

Thereafter, the glass composition according to an embodiment may form the coating film through following processes.

First, the glass composition according to an embodiment may be formed as a paste. The paste glass composition may include the glass frit, an organic binder, and an organic solvent.

Here, the glass frit may be contained in an amount of about 65 wt % to about 75 wt % in the paste, the organic binder may be contained in an amount of about 2 wt % to about 5 wt % in the paste, and the organic solvent may be contained in an amount of about 23 wt % to about 30 wt % in the paste.

Ethyl cellulose may be used as the organic binder, and α-terpineol may be used as the organic solvent.

Thereafter, the glass composition according to an embodiment is coated on one surface of a target object to be coated. The target object may be a metal plate or a glass plate. Particularly, the target object may be a portion or the whole of a cooking appliance. Particularly, the target object may be a door glass of a cooking appliance.

Thereafter, the target object coated with the glass composition according to an embodiment may be fired at a temperature of about 700° C. to about 900° C. The coated glass composition may be fired for about 100 seconds to about 400 seconds.

As a result, the glass composition according to an embodiment may form a coating film on the target object.

The coating film may have high heat resistance by combining components such as $ZrO_2$, $Al_2O_3$, $TiO_2$, and BaO. Also, the coating film may provide a glass having a high surface hardness through the components such as $Al_2O_3$, $SiO_2$, and $ZrO_2$.

Thus, the glass composition according to an embodiment may provide the coating film having improved heat resistance, cleaning performance, and chemical resistance.

Also, the glass composition according to an embodiment may contain $P_2O_5$ at a high rate. Also, the glass composition according to an embodiment may contain the Group I-based oxide at a high rate. As a result, the glass composition according to an embodiment may have high transmittance.

Thus, the glass composition according to an embodiment may be coated on the door glass of the cooking appliance such as an oven to form the coating film. Particularly, the coating film may be coated on the back surface of the door glass to improve the cleaning performance of the door glass without reducing the light transmittance of the door glass. The light transmittance of the coating film may be about 70% to about 75% which is substantially similar to that of the glass frit.

Also, the glass composition according to an embodiment may provide patterns having various shapes onto the door glass. That is, since the glass composition according to an embodiment has a light transmittance slightly less than that of the door glass, visibly recognizable patterns may be formed on the door glass.

Also, when the glass composition according to an embodiment is coated (fired), the door glass may be tempered. The firing temperature for the glass composition may be similar to the temperature of the heat tempering condition for the door glass. That is, the door glass may have characteristics of a tempered glass after the coating (firing) of the glass composition on its surface. Thus, the door glass may have an improved strength.

Hereinafter, a cooking appliance according to an embodiment will be described in detail with reference to the accompanying drawings.

Figure 2:
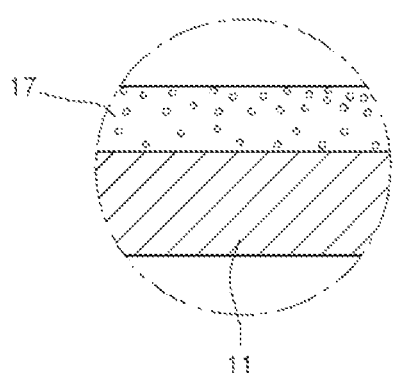
FIG. 2 is a partial enlarged cross-sectional view illustrating an inner surface of a cavity of FIG. 1.
Figure 3:
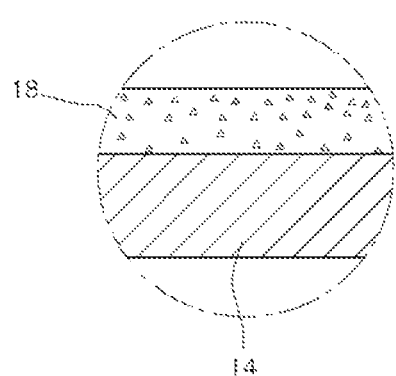
FIG. 3 is a partial enlarged cross-sectional view illustrating a back surface of a door of FIG. 1.

FIG. 1 is a front view of a cooking appliance according to an embodiment. FIG. 2 is a partial enlarged cross-sectional view illustrating an inner surface of a cavity of FIG. 1. FIG. 3 is a partial enlarged cross-sectional view illustrating a back surface of a door of FIG. 1.

Referring to FIG. 1, a cooking appliance 1 includes a cavity 11 defining a cooking chamber 12, a door 14 selectively opening or closing the cooking chamber 12, and at least one heating source 13, 15, or 16 providing heat for heating foods into the cooking chamber 12.

More particularly, the cavity 11 may have an approximately hexahedral shape with an opened front side. The heating sources 13, 15, and 16 include a convection assembly 13 for discharging heated air into the cavity 11, an upper heater 15 disposed on an upper portion of the cavity 11, and a lower heater 16 disposed on a lower portion of the cavity 11. The upper heater 15 and the lower heater 16 may be disposed inside or outside the cavity 11. Of cause, the heating source 13, 15, or 16 does not need to include the convection assembly 13, the upper heater 15, and the lower heater 16. That is, the heating source 13, 15, or 16 may include at least one of the convection assembly 13, the upper heater 15, and the lower heater 16.

Referring to FIG. 2, coating layer 17 is disposed on an inner surface of the cavity 11. The coating layer 17 is prepared by coating the above-described glass composition on the inner surface of the cavity 11.

Substantially, the coating layer 17 may improve heat resistance, chemical resistance, and contamination resistance on the inner surface of the cavity 11.

Referring to FIG. 3, the coating layer 18 is disposed on the back surface of the door 14. Particularly, the coating layer 18 may be disposed on the back surface of the door 14 facing the cooking chamber 12 in a state where the cooking chamber 12 is covered. The coating layer 18 may improve the heat resistance, the chemical resistance, and the contamination resistance on the back surface of the door 12. That is, the back surface of the door 14 may have the same effect as the inner surface of the cavity 11.

The door 14 includes a transparent door glass. The inside of the cooking appliance 1 may be viewed from the outside the door glass. The door glass may be a tempered glass.

Particularly, the coating layer 18 may be coated on the door glass. That is, the coating layer 18 may be coated on the back surface of the door glass.

Thus, the inner surface of the cavity 11 and the back surface of the door 14 may be improved in heat resistance and thus endured for a long time during the cooking and cleaning of the foods at a high temperature. Also, since the inner surface of the cavity 11 and the back surface of the door 14 are improved in contamination resistance by the coating layers 17 and 18, a phenomenon in which the inner surface of the cavity 11 and the back surface of the door 14 are contaminated by organic materials may be reduced, and also, the inner surface of the cavity 11 and the back surface of the door 14 may be easily cleaned. Also, since the inner surface of the cavity 11 and the back surface of the door 14 are improved in chemical resistance, the inner surface of the cavity 11 and the back surface of the door 14 are not corroded without being deformed by organic materials and alkali chemical components even though the cooking appliance is used for a long time.

The glass composition according to the embodiment may contain $P_2O_5$ at a high rate. Also, the glass composition according to the embodiment may contain the Group I-based oxide at a high rate. As a result, the glass composition according to the embodiment may have the high transmittance.

Thus, the glass composition according to the embodiment may be coated on the door glass of the cooking appliance such as the oven. That is, the glass composition according to the embodiment may be coated on the door glass to improve the cleaning performance of the door glass without reducing the light transmittance of the door glass.

Also, the glass composition according to the embodiment may provide the patterns having various shapes onto the door glass. That is, since the glass composition according to the embodiment has transmittance slightly less than that of the door glass, the visibly recognizable patterns may be formed on the door glass.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. Therefore, contents with respect to various variations and modifications will be construed as being included in the scope of the present disclosure.

EXPERIMENTAL EXAMPLE

As shown in Table 1 below, a glass frit material is provided. Thereafter, the glass frit material is melted for 1 hour at a temperature of about 1,500° C. Thereafter, the melted glass frit material is quenched through water to manufacture a raw frit. Then, the raw frit is dispersed into ethyl alcohol and milled for 2 hours by using a planetary mill. The raw frit is dried to form a glass frit.

Then, about 70 wt % of the glass frit, about 3 wt % of ethyl cellulose, and about 27 wt % of α-terpineol are mixed by a paste mixer to form a paste. Thereafter, the paste is coated on a soda lime glass with a thickness of about 0.3 mm.

Thereafter, the coated paste is fired at a temperature of about 700° C. for about 300 seconds to form a coating film.

TABLE 1

| Component | Rate (wt %) |
| --- | --- |
| $P_2O_5$ | 70 |
| $Al_2O_3$ | 2 |
| $Na_2O$ | 16.5 |
| $K_2O$ | 4.5 |
| $B_2O_3$ | 3.5 |
| ZnO | 3 |
| $TiO_2$ | 0.5 |

Results

It is seen that the coating film formed as described above has a glass deformation temperature Td of about 418° C., i.e., very high heat resistance characteristics. Particularly, to measure a thermal expansion coefficient and a heat resistance characteristic of a glass, both surfaces of a sample is ground in parallel, and then, a transition temperature and thermal expansion coefficient are measured up to a glass deformation temperature by using a thermo mechanical analyzer (TMA).

Cleaning performance of the above-described glass composition is measured. In a method of measuring the cleaning performance, about 1 g of chicken oil or monster mesh is smoothly covered on a surface of a test body (a sample coated with a glass composition having a square of about 200 mm×200 mm) by using a brush, and then, the test body coated with the contaminant is put into a constant-temperature oven to solidify the contaminant at 2400 for 1 hour. After the contaminant is solidified, the test body is naturally cooled to confirm a cured degree thereof. Then, the test body is immersed into a 25° C. water bath for about 10 minutes. Thereafter, the cured chicken oil is polished with a force of less than 2.5 kgf by using a wet cloth. The surface of the contaminated glass is uniformly polished by using a rod having a flat bottom with a diameter of about 5 cm. Here, reciprocating numbers for polishing are measured and then defined as cleaning numbers. Here, an evaluation index is as follows. The cleaning performance of the coating film formed by the glass composition, which is measured through the above-described method, is Level 5. Table 2 below shows the criteria for the cleaning performance.

Also, acid and alkali resistance performance of the coating film formed of the glass composition is measured. The acid resistance is measured by observing a surface change of the coating film after a few drops of 10% of a citric acid solution onto the sample of the fired glass and then cleanly polish the solution after 15 minutes. The alkali resistance evaluation is performed by using 10% of an anhydrous sodium carbonate solution as a reagent through the same method as the acid resistance evaluation.

As a result, the acid resistance performance of the coating film formed of the glass composition is Grade A, and the alkali resistance performance is Grade AA. A degree of the acid and alkali resistance performance is evaluated by an ASTM or ISO 2722 method. Here, Grade AA represents very good, Grade A represents good, Grade B represents normal, Grade C represents low, and Grade D represents very low.

TABLE 2

| Cleaning number (Number) | Level |
| --- | --- |
| 1~5 | 5 |
| 6~15 | 4 |
| 16~25 | 3 |
| 26~50 | 2 |
| 51~ | 1 |

As described above, it is seen that the coating film has a high cleaning performance, thermal shock stability, high chemical resistance, and high adhesion.

Also, the coating film has a light transmittance of about 75%.

What is claimed is:

1. A glass composition comprising:
    a glass frit containing $P_2O_5$, ZnO, $TiO_2$, a Group I-based oxide, and a Group III-based oxide,
    wherein the Group I-based oxide comprises $Na_2O$, $K_2O$, and $Li_2O$,
    wherein the Group III-based oxide comprises $Al_2O_3$ and $B_2O_3$, and
    wherein the glass frit comprises 65 wt % to 75 wt % of $P_2O_5$, 1 wt % to 3 wt % of $Al_2O_3$, 15 wt % to 18 wt % of $Na_2O$, 4 wt % to 5 wt % of $K_2O$, 3 wt % to 4 wt % of $B_2O_3$, 2 wt % to 4 wt % of ZnO, and 0.1 wt % to 1 wt % of $TiO_2$.

2. The glass composition according to claim 1, wherein the glass frit further comprises one or more compounds selected from the group consisting of SiO2, ZrO2, CaO, MgO, BaO, and WO3.

3. A method of preparing a glass composition, the method comprising:
    preparing a glass frit material comprising $P_2O_5$, ZnO, $TiO_2$, a Group I-based oxide, and a Group III-based oxide;
    melting the glass frit material; and
    quenching the melted glass frit material to form a glass frit,
    wherein the Group I-based oxide comprises $Na_2O$, $K_2O$, and $Li_2O$,
    wherein the Group III-based oxide comprises $Al_2O_3$ and $B_2O_3$, and
    wherein the glass frit comprises 65 wt % to 75 wt % of $P_2O_5$, 1 wt % to 3 wt % of $Al_2O_3$, 15 wt % to 18 wt % of Na$_2$O, 4 wt % to 5 wt % of K$_2$O, 3 wt % to 4 wt % of B$_2$O$_3$, 2 wt % to 4 wt % of ZnO, and 0.1 wt % to 1 wt % of TiO$_2$.

4. A cooking appliance comprising:
a cavity defining a cooking chamber;
a door selectively opening or closing the cooking chamber;
a heating source providing heat to heat foods in the cooking chamber; and
a coating layer formed of the glass composition according to claim 1, which is coated on a back surface of the door facing the cooking chamber in a state where the cooking chamber is covered.

5. The cooking appliance according to claim 4, wherein the door comprises a transparent door glass, and
wherein the coating layer is coated on the door glass.

6. The cooking appliance according to claim 5, wherein the door glass coated with the coating layer is tempered.

7. The cooking appliance according to claim 5, wherein the coating layer coated on the door glass forms a pattern.

8. The glass composition according to claim 1, wherein the glass frit has a glass deformation temperature of more than 410° C.

9. The glass composition according to claim 1, wherein the glass frit has a light transmittance of 70% to 75%.

10. The glass composition according to claim 1, wherein the glass frit has a diameter of 0.1 μm to 50 μm.

\* \* \* \* \*